US008819941B2

(12) United States Patent
Mensch (10) Patent No.: US 8,819,941 B2
(45) Date of Patent: Sep. 2, 2014

(54) NUT OPENING APPARATUS (76) Inventor: Martin Mensch, Danville, PA (US)

(*) Notice: Subject to any disclaimer, the term of this patent is extended or adjusted under 35 U.S.C. 154(b) by 450 days.

(21) Appl. No.: 13/213,732

(22) Filed: Aug. 19, 2011

(65) Prior Publication Data

US 2013/0042484 A1 Feb. 21, 2013

(51) Int. Cl.
*A47J 43/26* (2006.01)
(52) U.S. Cl.
CPC .................................... *A47J 43/26* (2013.01)
USPC .................... 30/120.4; 30/113.2; 30/113.3
(58) Field of Classification Search
CPC ............ A47J 43/26; A47J 23/00; B25B 7/00; B25B 17/00; B25B 17/003
USPC ........... 30/28, 29, 113.1, 113.2, 113.3, 120.1, 30/120.2, 120.3, 120.4, 142, 253
See application file for complete search history.

(56) References Cited

U.S. PATENT DOCUMENTS

| | | | |
|---|---|---|---|
| 326,909 A | | 9/1885 | Kricker |
| 340,053 A | * | 4/1886 | Lytle ................................ 30/253 |
| 389,925 A | * | 9/1888 | Griscom ....................... 294/106 |
| 478,009 A | | 6/1892 | Hollis |
| 549,680 A | * | 11/1895 | Morley ........................ 30/113.2 |
| 549,690 A | | 11/1895 | Morley |
| 1,083,918 A | * | 1/1914 | Bunzl ............................ 30/174 |
| 1,122,165 A | | 12/1914 | Schoening |
| 1,178,684 A | | 4/1916 | Shimoda |
| 1,256,439 A | | 2/1918 | Clark |
| 1,324,557 A | | 12/1919 | Landaw |
| 1,351,216 A | | 8/1920 | Pifer |
| 1,428,789 A | | 9/1922 | Lawson |
| 1,539,156 A | | 5/1925 | Burgess |
| 1,622,309 A | | 3/1927 | De Forest |
| 1,646,564 A | | 10/1927 | Vaughan |
| 1,994,473 A | | 3/1935 | Jones |
| 2,113,500 A | | 4/1938 | Stathem |
| 2,202,984 A | | 6/1940 | Drypolcher |
| 2,222,744 A | | 11/1940 | Gallien |
| 2,454,601 A | * | 11/1948 | Gallagher ................... 30/120.4 |
| 2,472,354 A | | 6/1949 | Walters |
| 2,481,647 A | | 9/1949 | Generes |
| 2,483,383 A | | 9/1949 | Heimann et al. |
| 2,513,505 A | | 7/1950 | McKinnon |
| 2,570,881 A | | 10/1951 | Stewart |
| 2,643,565 A | | 6/1953 | Mount |
| 2,647,278 A | | 8/1953 | Weinberger |
| 2,751,948 A | | 6/1956 | Facchini |
| 2,757,666 A | | 8/1956 | Grant |
| 3,044,081 A | | 7/1962 | Robinson, Jr. |
| 3,074,449 A | | 1/1963 | Mikulas |
| 3,540,106 A | | 11/1970 | Goldman |

(Continued)

FOREIGN PATENT DOCUMENTS

| | | | |
|---|---|---|---|
| CH | 261934 | * | 6/1949 |
| DE | 44 11 778 | * | 12/1995 |

*Primary Examiner* — Hwei C Payer
(74) *Attorney, Agent, or Firm* — Hahn Loeser & Parks, LLP; Shannon V. McCue (57) ABSTRACT

A monolithic nut opening apparatus includes a hinge portion forming a rearward end. A first elongated arm and a second elongated arm longitudinally extend towards a forward end from opposing ends of the hinge portion. A first tip extends from the first elongated arm and at least one upward extending lateral tapered edge extending from the first tip. A second tip extends from the second elongated arm and at least one downward extending lateral tapered edge extending from the second tip.

13 Claims, 10 Drawing Sheets

(56) References Cited

U.S. PATENT DOCUMENTS

| | | | |
|---|---|---|---|
| 3,817,078 A | 6/1974 | Reed et al. | |
| 3,936,934 A * | 2/1976 | Bowden | 30/113.2 |
| 4,068,573 A | 1/1978 | Romero | |
| 4,090,420 A | 5/1978 | Insolio | |
| D262,055 S | 11/1981 | Luikart | |
| 4,317,281 A | 3/1982 | Yowa | |
| 4,395,823 A | 8/1983 | Thibault | |
| 4,462,156 A | 7/1984 | Himelhoch | |
| D276,880 S | 12/1984 | Tozaburo | |
| 4,539,873 A | 9/1985 | Freed | |
| 4,574,477 A * | 3/1986 | Lemkin et al. | 30/92 |
| D284,216 S | 6/1986 | Dyson-Hughes | |
| 4,619,046 A | 10/1986 | Goulter | |
| 4,621,401 A | 11/1986 | Anderson | |
| 4,658,489 A | 4/1987 | Johnston | |
| 4,744,145 A * | 5/1988 | Lee | 30/134 |
| D298,408 S | 11/1988 | Johnston | |
| 4,852,255 A * | 8/1989 | Hochfeld | 30/102 |
| 5,007,313 A | 4/1991 | Jeromson, Jr. et al. | |
| 5,065,650 A | 11/1991 | Anderson et al. | |
| 5,174,177 A | 12/1992 | Jeromson et al. | |
| 5,217,464 A | 6/1993 | McDonald | |
| 5,265,339 A * | 11/1993 | Nilsson | 30/91.1 |
| 5,339,524 A | 8/1994 | Sawyer, III et al. | |
| 5,353,505 A * | 10/1994 | Okada | 30/253 |
| 5,515,587 A | 5/1996 | Pool | |
| 5,522,290 A | 6/1996 | Visser et al. | |
| 5,566,452 A | 10/1996 | Sample | |
| 5,709,660 A | 1/1998 | Doyle et al. | |
| 5,826,467 A | 10/1998 | Huang | |
| 5,964,033 A * | 10/1999 | Wolf | 30/28 |
| 6,035,508 A | 3/2000 | Smith | |
| 6,145,417 A | 11/2000 | Bates et al. | |
| 6,185,771 B1 * | 2/2001 | Trusty, Sr. | 7/128 |
| 6,257,105 B1 | 7/2001 | Lin | |
| 6,317,987 B1 * | 11/2001 | Joung | 30/236 |
| 6,378,213 B1 | 4/2002 | Griffith | |
| 6,378,403 B1 | 4/2002 | Bates et al. | |
| 6,378,404 B1 | 4/2002 | Bally et al. | |
| 6,470,774 B2 | 10/2002 | Chang | |
| 6,609,303 B2 | 8/2003 | Rogel | |
| 6,785,967 B1 | 9/2004 | Allievi | |
| 6,786,117 B1 | 9/2004 | Tseng | |
| D545,643 S | 7/2007 | Roger | |
| 7,243,826 B2 | 7/2007 | Darst | |
| 7,357,952 B2 | 4/2008 | Foroutanaliabad | |
| 7,695,750 B2 | 4/2010 | Foroutanaliabad et al. | |
| 7,845,081 B1 * | 12/2010 | Shultz | 30/113.2 |
| 7,909,682 B1 | 3/2011 | Goodman | |
| 2001/0002513 A1 | 6/2001 | Rogel | |
| 2002/0104219 A1 | 8/2002 | Olson | |
| 2005/0235496 A1 | 10/2005 | Shagday et al. | |
| 2007/0130775 A1 | 6/2007 | Holbrook | |
| 2013/0042484 A1 * | 2/2013 | Mensch | 30/120.3 |

\* cited by examiner

NUT OPENING APPARATUS

TECHNICAL FIELD

The invention described herein relates to nut opening apparatuses and, more particularly, to a nut opening apparatus having a monolithic structure.

DISCUSSION OF ART

Nuts are a popular staple for consumers to eat as a snack or to serve to guests when entertaining. Typically, for nuts with closed shells, consumers use devices such as nutcrackers and/or picks to crush or crack the shell to access the edible meat inside. In cases where nuts have shells that are partially split from undergoing dehiscence, however, consumers generally forego the use of a device and instead use fingernails and/or teeth to open the shell, which may cause unexpected consumer injury. Accordingly, a need exists for an apparatus that will easily open a nut shell without causing harm to a consumer.

BRIEF DESCRIPTION

In accordance with the present invention, there is provided a monolithic nut opening apparatus that includes a hinge portion forming a rearward end. A first elongated arm and a second elongated arm longitudinally extend towards a forward end from opposing ends of the hinge portion. A first tip extends from the first elongated arm and at least one upward extending lateral tapered edge extending from the first tip. A second tip extends from the second elongated arm and at least one downward extending lateral tapered edge extending from the second tip.

Also within the scope of the invention is a nut opening apparatus that includes a hinge portion having two ends. A first arm and a second arm longitudinally extend away from the two ends of the hinge portion. A first tip has two laterally opposing upward extending tapered edges, wherein the first tip extends from the first arm. A second tip has two laterally opposing downward extending tapered edges, wherein the second tip extends from the second arm, and wherein the hinge portion, the first arm, the first tip, the second arm, and the second tip form one piece.

Also within the scope of the invention is a monolithic opening apparatus that includes a hinge having a longitudinally extending first arm and a longitudinally extending second arm. A first tip includes at least one lateral tapered edge, wherein the first tip extends from the longitudinally extending first arm. A second tip has at least one lateral tapered edge, wherein the second tip extends from the longitudinally extending second arm. The hinge, the first arm, the first tip, the second arm, and the second tip form one continuous monolithic structure, wherein the second tip is configured to slideably engage the first tip.

These and other objects of this invention will be evident when viewed in light of the drawings, detailed description and appended claims.

BRIEF DESCRIPTION OF THE DRAWINGS

Reference is made to the accompanying drawings in which particular embodiments of the invention are illustrated as described in more detail in the description below, in which:

FIGS. 4B-4E are forward end views of the nut opening apparatus engaging opposing shell portions of a nut (shown in dashed lines), where
FIGS. 4B-4E are progressive illustrations of the nut opening apparatus separating the opposing shell portions.

DETAILED DESCRIPTION

The invention includes embodiments that relate to nut opening apparatuses and, more particularly, to a monolithic, flexible nut opening apparatus. With reference to the drawings, wherein like reference numerals designate identical or corresponding parts throughout the several views, several embodiments of the disclosed nut opening apparatus will be described. The embodiments are related to a nut opening apparatus having a generally monolithic piece made from a flexible material The nut opening apparatus can be held in the palm of a hand and can be squeezed or actuated to split open or crush a variety of nut species, such as pistachios.

Figure 1:
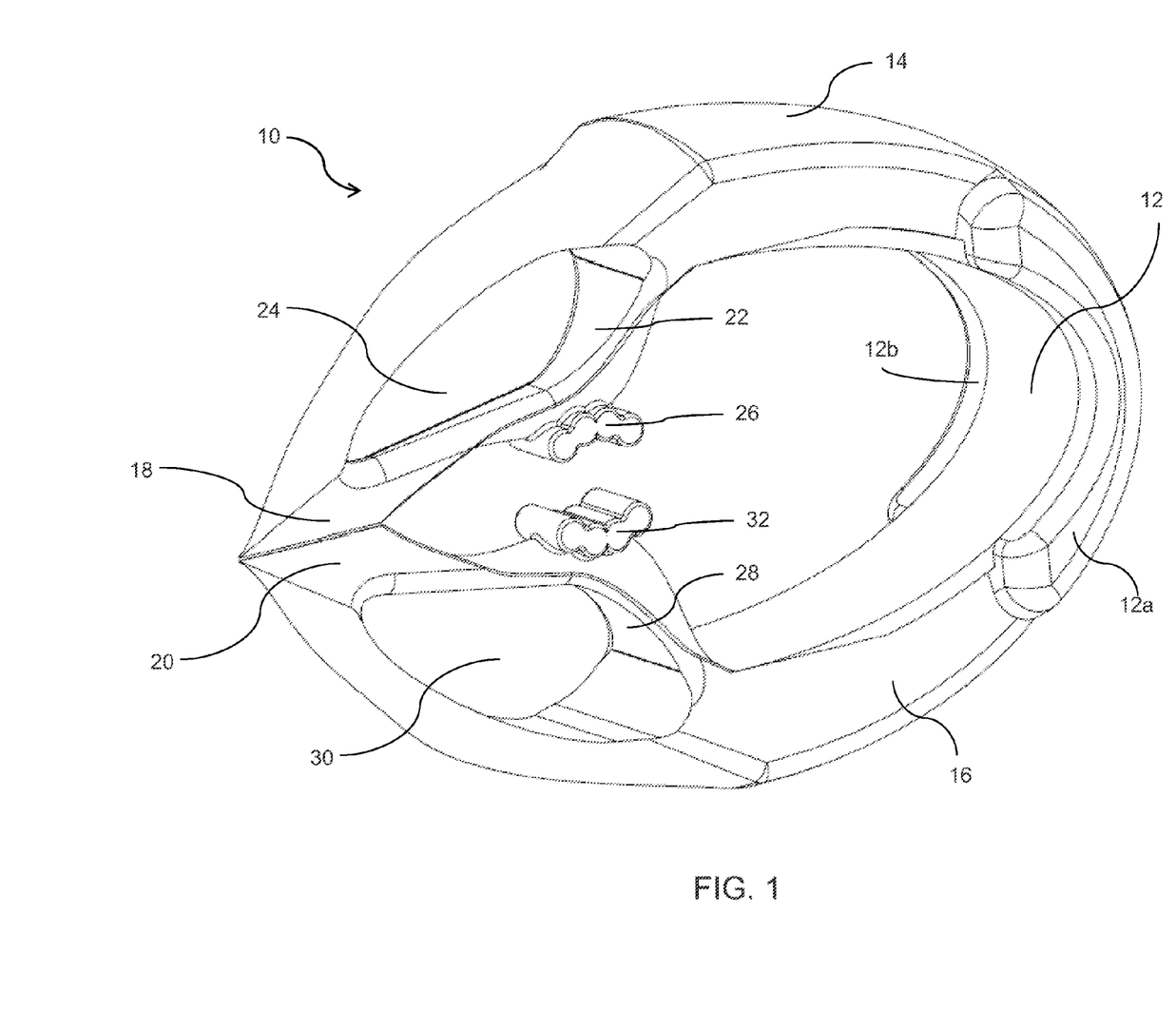
FIG. 1 is a top perspective view of a nut opening apparatus.

Referring now to the drawings wherein the showings are for purposes of illustrating an embodiment of the invention only and not for purposes of limiting the same, FIG. 1 discloses a nut opening apparatus 10. Nut opening apparatus 10 has a general c-shape, single piece or monolithic construction, including hinge portion 12, first elongated arm member 14, second elongated arm member 16, first tip 18, and second tip 20. First elongated arm member 14 and second elongated arm member 16 are mirror images of each other about a horizontal axis that vertically bisects hinge portion 12.

Each arm has an arcuate shape that longitudinally extends from hinge portion 12. First elongated arm member 14 extends to first tip 18 and second elongated arm member 16 extends to second tip 20. In another embodiment, the nut opening apparatus has another single piece or monolithic construction or shape, including a partial square or partial rectangular shape, a partial triangular shape, a partial elliptical or partial circular shape, and the like. In yet another embodiment, first elongated arm member and second elongated arm member are not mirror images, but have distinct elongated, longitudinally extending shapes that extend from the hinge portion to the tips.

In the illustrated embodiment, arcuate shaped hinge portion 12 is resiliently flexible and includes reinforcing ribs 12a and 12b on each lateral edge, providing additional strength to hinge portion 12. A resiliently flexible hinge portion allows the arms and tips to flex towards each other when a radially inward force is applied to the arms and allows the hinge portion to substantially return back to an original shape when force is not applied. In the illustrated embodiment, hinge portion 12 having reinforcing ribs 12a and 12b has a lateral width that is greater than widths of first elongated arm member 14 and second elongated arm member 16. In another embodiment, the nut opening apparatus does not include reinforcing ribs. In yet another embodiment, the reinforcing ribs longitudinally extend further onto at least a portion of first elongated arm member and/or second elongated arm member. In another embodiment, the hinge portion may have a reinforced circular shape, a spiral shape, a helical shape, or another shape that gives the apparatus resilient flexibility.

An upper crusher portion 22 extends downward from first elongated arm member 14 and has an upward facing arcuate shape that longitudinally extends to first tip 18. An upper crusher portion 22 and a forward portion of first elongated arm member 14 form upper aperture 24. Extending downward from the upper crusher portion 22 is an upper crusher 26 or upper stop that includes four laterally extending tubular members or grippers that form a downward concave arcuate shape. In another embodiment, the upper crusher portion and the forward portion of first elongated arm member form more than one aperture or do not form an aperture. In yet another embodiment, the upper crusher forms a partial circle shape, partial ellipse shape, or a partial square or rectangular shape. In another embodiment, any aperture may include a web or reinforcing rib extending radially inward. In yet another embodiment, the crushers have another laterally extending form, e.g., square and sinusoidal. In another embodiment, the tip may have any shape, including but not limited to triangular, square, flat, rounded, at least one point, a concave contour, and an offset angled edge.

A lower crusher portion 28 extends upward from second elongated arm member 16 and has a downward facing arcuate shape that longitudinally extends to second tip 20. Second tip 20 is vertically stacked with first tip 18. In another embodiment, the first tip and second tip are not stacked, rather, the first and second tips are laterally offset. In the illustrated embodiment, a lower crusher portion 28 and a forward portion of second elongated arm member 16 form lower aperture 30. Extending upward from lower crusher portion 28 is a lower crusher 32 or lower stop that includes four laterally extending tubular members or grippers that form an upward concave arcuate shape. In another embodiment, the lower crusher portion and the forward portion of second elongated arm member form more than one aperture or do not form an aperture. In yet another embodiment, the lower crusher forms a partial circle shape, partial ellipse shape, or a partial square or rectangular shape. The upper crusher 26 and the lower crusher 32 transfer radially inward forces applied to the handles to crack and/or crush shells on edible nuts. In another embodiment, the crushers or stops may include more or less than four members or grippers, e.g., three grippers. In yet another embodiment, the top and bottom crushers or stops may have different shapes, e.g., the bottom may have a square laterally extending shape and the top may have a concave arcuate shape.

The nut opening apparatus 10 is a single piece or monolithic construction made from a resiliently flexible material. The nut opening apparatus may be made by injection molding, machining, forging, casting, or by one or more alternative manufacturing processes. A non-limiting list of example materials includes thermoset resins, thermoplastic resins, reinforced resins of either type, biodegradable resins, recyclable resins, and engineered resins. For example, a nut opening apparatus made from thermoplastics may be made from a non-exhaustive and non-limiting list that includes (meth) acrylics, celluloids, ethylene-vinyl acetate, flouroplastics, polyacrylates, polyamides, polybutylene, polycaprolactone, polycarbonate, polyethylene, polypropylene, and polyvinyl chloride. A non-exhaustive and exemplary list of thermosets includes vulcanized rubbers, melamine resin, polyimides, and fiberglass-filled polyesters as well as crosslinked thermoplastics. In another embodiment, the nut opening apparatus may be made from metal, including a non-exhaustive, exemplary list of metals that includes carbon steel, stainless steel, aluminum, and copper. Oils, plasticizers, colorants, and reinforcing agents may be included in at least a portion of the nut opening apparatus. The nut opening apparatus made of metal may be further coated with a paint or another coating.

In yet another embodiment, the nut opening apparatus is made from two or more materials. For example, the hinge portion 12 can be comprised of a first material, the elongated arm members 14, 16 can be comprised of a second material, and the tips 18, 20 can be comprised of a third material. Materials that provide adequate resiliency and durability for the hinge portion 12 may be inadequate for tips 18, 20, which require a greater density and/or hardness as they perform disparate functions within the nut opening apparatus 10. In an embodiment, the opening apparatus 10 is made of a single material wherein a coating or sleeve is included to provide desired hardness and/or durability in particular apparatus locations.

Figure 2:
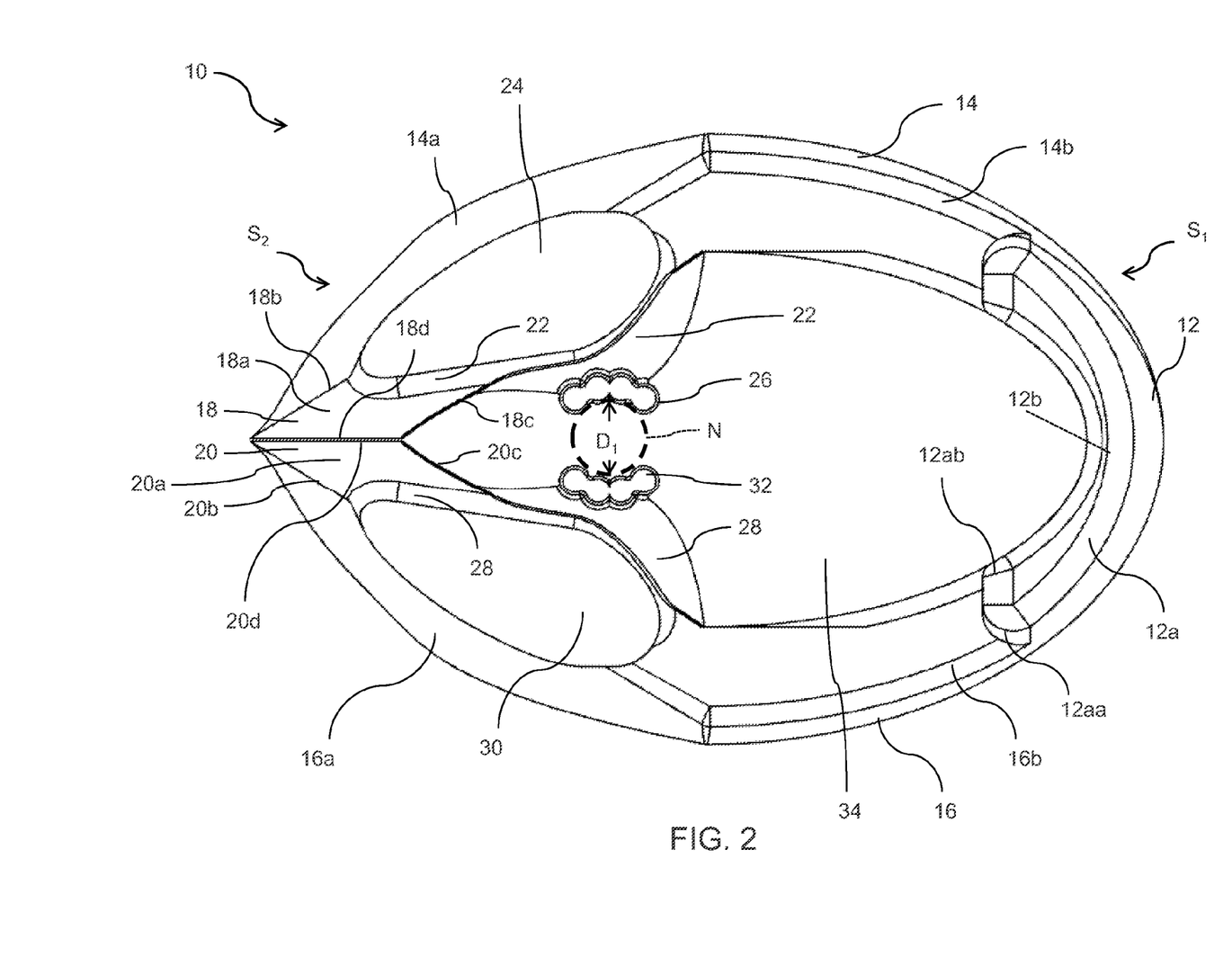
FIG. 2 is a side view of the nut opening apparatus.

FIG. 2 illustrates a side view of the nut opening apparatus 10 illustrated in FIG. 1 showing a nut N (shown in dashed lines), e.g., a pistachio nut, illustrated between the upper crusher 26 and the lower crusher 32. In the illustrated embodiment, the hinge portion 12 has a substantially vertical arcuate c-shape and is on a rearward side S1 of nut opening apparatus 10. The rearward side S1 is opposite of the forward side S2 where the first tip 18 is longitudinally adjacent to the second tip 20. Extending laterally from opposing lateral sides of hinge portion 12 are the reinforcing ribs 12a and 12b, both generally forming a substantially vertical arcuate shape that is substantially similar in shape to hinge portion 12. The reinforcing rib 12a is illustrated as having first arcuate portion 12aa and second arcuate portion 12ab. In another embodiment, reinforcing ribs include more or less than two portions. In yet another embodiment, at least one reinforcing rib has a smaller or larger arcuate shape than what is illustrated in FIG. 2, i.e., at least one reinforcing rib extends longitudinally shorter or longer than the ribs illustrated in FIG. 2. In another embodiment, the hinge portion may have another shape, including but not limited to a wave like shape.

In the illustrated embodiment, first elongated arm member 14 includes forward portion 14a and rearward portion 14b and second elongated arm member 16 includes forward portion 16a and rearward portion 16b. Rearward portions 14b and 16b are longitudinally separated by aperture 34. The rearward portions 14b and 16b have vertical tapered cross sections having larger lateral widths on radially outer perimeters and smaller lateral widths on radially inner perimeters of nut opening apparatus 10. The larger lateral widths on the radially outer perimeters of nut opening apparatus 10 allow a person's hand to comfortably grip nut opening apparatus 10. Rearward portions 14b and 16b are shown as having perimeters formed from more than one surface. In another embodiment, the rearward portions have an alternative cross section, for example, a circular or elliptical cross section.

In yet another embodiment, the rearward portions are configured to receive indicia of various forms, including but not limited to numbers, letters, and/or trademarks. Alternatively or in addition, a platform or other surface (not shown) is disposed within the aperture 34. The platform can be supported by the rearward portions 14b, 16b as part of a unitary component which is molded or otherwise fabricated in the creation of the apparatus 10. In an embodiment, the platform is removably disposed within the aperture 34 to allow platforms (e.g., with disparate logos) to be swapped out as desired. In one example, the platform includes tabs or similarly extending portions that are snapped or otherwise positioned within commensurate seating locations.

In another embodiment, rearward portions 14b and 16b may include another feature, including but not limited to a bottle opener portion on each rearward portion that can engage and twist open a cap on a bottle or a key chain connection on a forward or rearward portion of one of the arms. In yet another embodiment, the aperture may be larger or smaller than what is illustrated in FIG. 2.

In the illustrated embodiment, first distance D1 separates center portions of upper crusher 26 and lower crusher 32 so that a nut can be at least partially held and/or at least partially crushed by the crushers. For example, first distance D1 may range from 2-60 mm. In another embodiment the first distance D1 is from 3-50 mm. In yet another embodiment the first distance D1 is 4-40 mm. In another embodiment the first distance D1 is from 4-30 mm. In another embodiment the first distance D1 is from 5-20 mm. In yet another embodiment the first distance D1 is 10-14 mm. In yet another embodiment, the first distance is greater than or less than 10-14 mm to accommodate a smaller or larger nut or the like. In addition, upper crusher 26 and lower crusher 32 form a vertical hard stop to prevent over flexing of hinge portion 12.

In the illustrated embodiment, arcuate shaped forward portion 14a longitudinally extends from rearward portion 14b to first tip 18. Similarly, arcuate shaped forward portion 16a longitudinally extends from rearward portion 16b to second tip 20. First tip 18 and second tip 20 can independently or jointly be inserted into an initial opening of a nut shell, e.g., a pistachio nut shell having a shell opening on one side. Forward portion 14a and forward portion 16a each have a curved outer perimeter to allow a person's hand to comfortably grip nut opening apparatus 10. In another embodiment, at least one of the forward portions has another outer perimeter shape, e.g., a curved shape that includes concave finger positions.

Figure 2A:
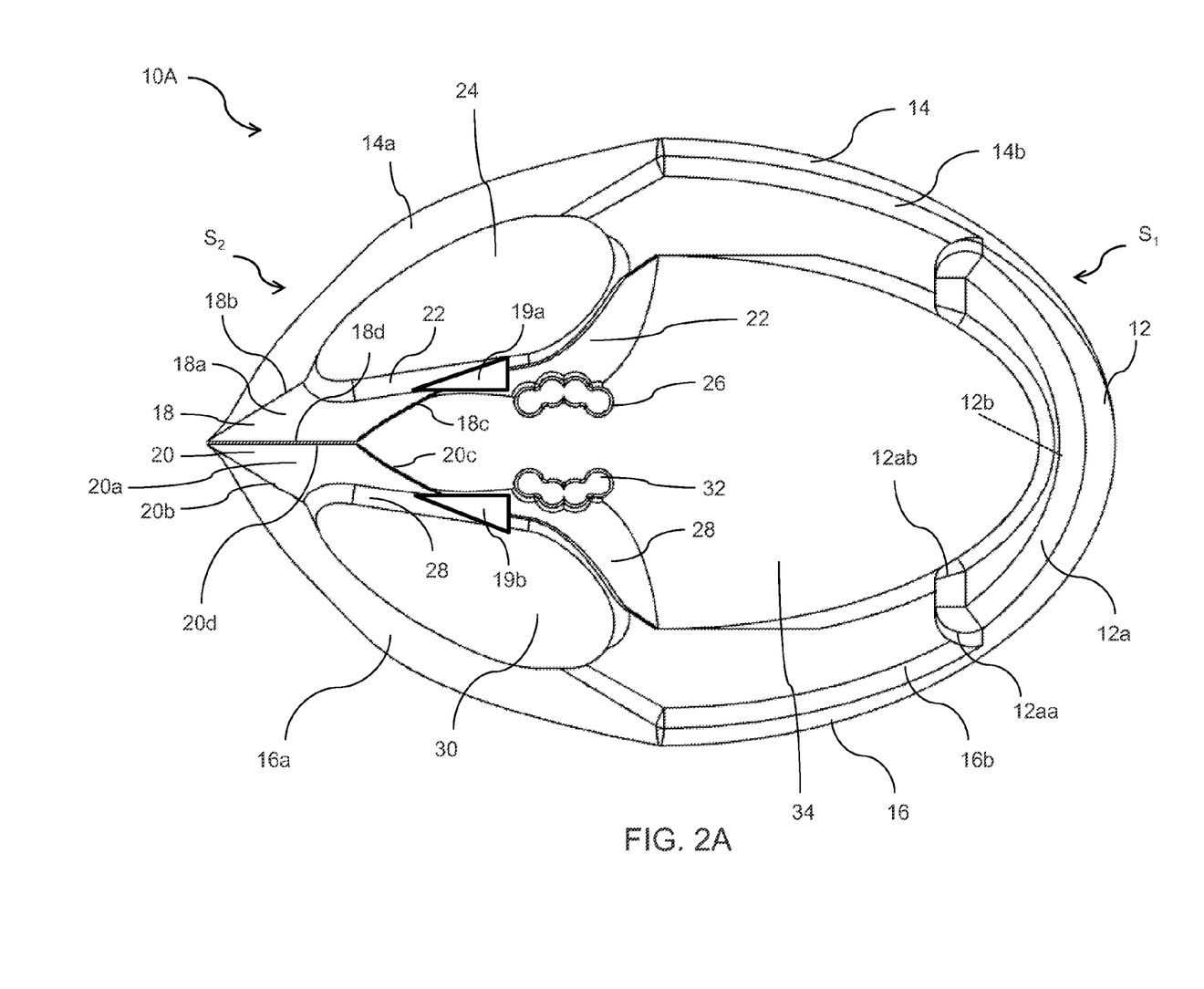
FIG. 2A is a side view of an alternative nut opening apparatus.

FIG. 2A illustrates a side view of another nut opening apparatus 10A that is substantially similar to the nut opening apparatus 10 illustrated in FIGS. 1-2, except nut opening apparatus 10A illustrated in FIG. 2A includes at least one offset angled edge 19a protruding from the upper crusher portion 22 and at least one offset angled edge 19b protruding from the lower crusher portion 28. Both the offset angled edges 19a and 19b are longitudinally spaced from the forward ends of first tip 18 and second tip 20, respectively. In another embodiment, the nut opening apparatus may include two or more angled edges on at least one longitudinally extending arm to facilitate increasing the opening rate of a nut (not shown). Offset angled edges may be equal or unequal angles and may be angles relative to a vertical plane (not shown) that is in the range of about 10 degrees to about 70 degrees (similar to the angles discussed below).

Figure 3:
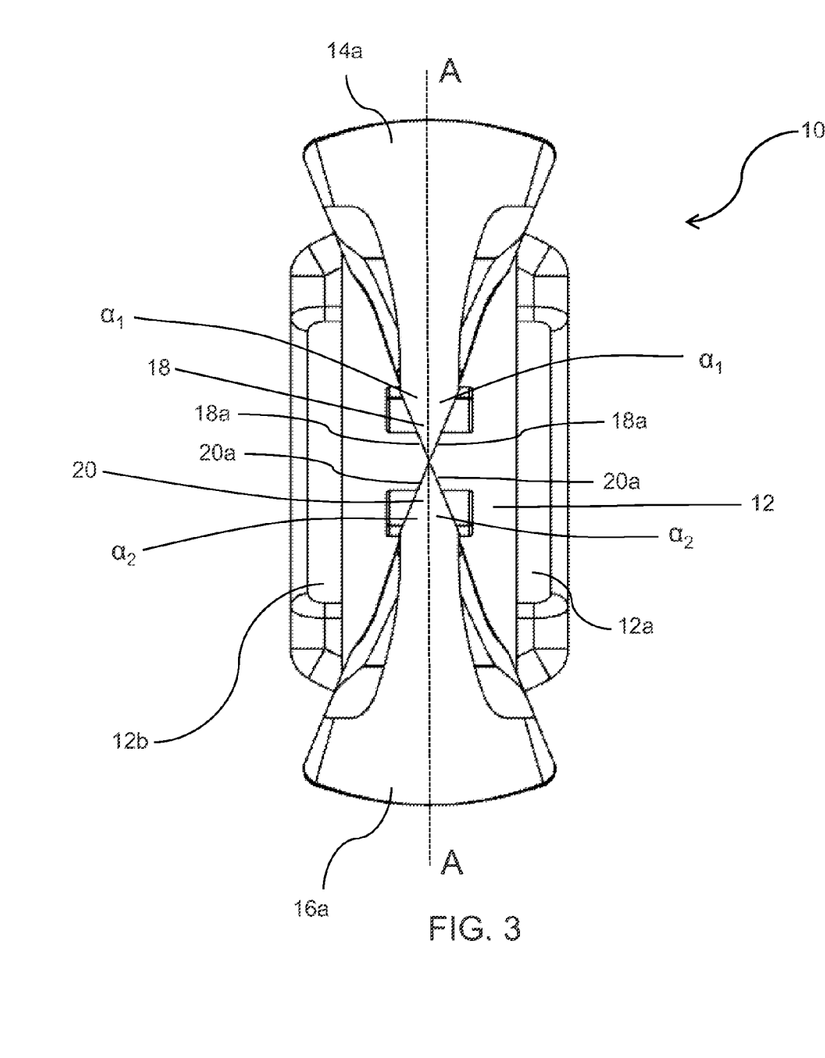
FIG. 3 is a forward end view of the nut opening apparatus.

FIG. 3 illustrates an end view of the nut opening apparatus 10 in an initial position, i.e., no forces are applied to the apparatus. FIGS. 2-3 illustrate the forward portions and the upper and lower crusher portions that form the first and second tips. In the illustrated embodiments, first tip 18 includes two upward extending tapered edges 18a that fashion an upper arrow-shaped tip or pincer. Each upward extending tapered edge 18a extends longitudinally from forward edge 18b to rearward edge 18c and extends vertically from bottom edge 18d upward to upper crusher portion 22. Similarly, second tip 20 includes two downward extending tapered edges 20a that fashion a lower arrow-shaped tip or pincer. Each downward extending tapered edge 20a extends longitudinally from forward edge 20b to rearward edge 20c and extends vertically from upper edge 20d downward to lower crusher portion 28. In another embodiment, the tips may include more or less edges than what are illustrated in FIGS. 2-3. In another embodiment, the tips may be slightly rounded, chamfered, curved, or may have concave contours. In yet another embodiment, the bottom edge of the first tip and the upper edge of the second tip may not have equal longitudinally extending portions.

In the illustrated embodiment shown in FIG. 3, upward extending tapered edges 18a are at an angle $\alpha 1$ relative to a vertical plane A-A and downward extending tapered edges 20a are at an angle $\alpha 2$ relative to the vertical plane A-A. In the illustrated embodiment, angle $\alpha 1$ and angle $\alpha 2$ are substantially equal, e.g., about thirty degrees. In another embodiment, at least one of the angles of the tapered edges is not substantially equal to at least one other angle. In yet another embodiment, angle $\alpha 1$ and/or angle $\alpha 2$ are about 10 to about 70 degrees. In another embodiment, angle $\alpha 1$ and/or angle $\alpha 2$ are about 15 to about 45 degrees. In yet another embodiment, angle $\alpha 1$ and/or angle $\alpha 2$ are about 20 to about 40 degrees. In the illustrated embodiment, the tapered edges on both lateral sides of first tip 18 and second tip 20 are fashioned to allow first tip 18 to slide downward on either downward extending tapered edge 20a of second tip 20, e.g., along the left or the right downward extending tapered edge. Similarly, second tip 20 can slide upward on either upward extending tapered edge 18a of first tip 18, e.g., along the left or the right upward extending tapered edge.

In an embodiment, tapered edges 18a and 20a have inconsistent profiles wherein the angle changes relative to distance from the respective points of the first and second tips 18, 20 respectively. For example, the angle may be around 30 degrees up to a distance of 15 mm from the points and around 60 degrees from 15-30 mm from the points. In this manner, the opening apparatus 10 can uniformly open the gap between shell halves until a predetermined insertion when the sudden change in angle causes the shell to break completely. In an embodiment, a set of three or more angles are employed for edges 18a, 20a in a stepwise fashion. In another embodiment, the angles along edges 18a, 20a are different from one another.

Figure 4A:
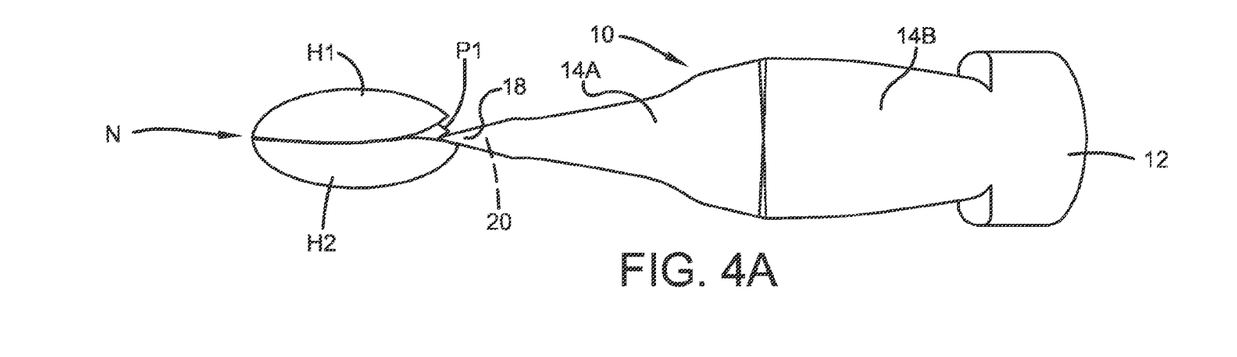
FIG. 4A is a top view of the nut opening apparatus.

FIG. 4A is a top view of nut opening apparatus 10 in proximity to nut N having first shell H1, second shell H2, and a partial opening P1 that exposes the edible kernel or meat of nut N. In the illustrated embodiment, first tip 18 and second tip 20 are in partial opening P1 between edge portions of first half shell H1 and second half shell H2. The tips are shaped to act like two wedges or knives that push against each other to impart opening forces at the points where the shells meet. Partial opening P1 is typically on a more pointed portion of nut N. The opposing arrow shaped tips or pincers are configured to fit any size partial opening or slit between the half shells. In another embodiment, the first tip and second tip fit in a partial opening that is smaller or larger than the partial opening illustrated in FIG. 4A. In yet another embodiment, the nut opening apparatus may be configured so one tip can initially pry open and/or wedge open the half shells.

Figures 4B, 4C:
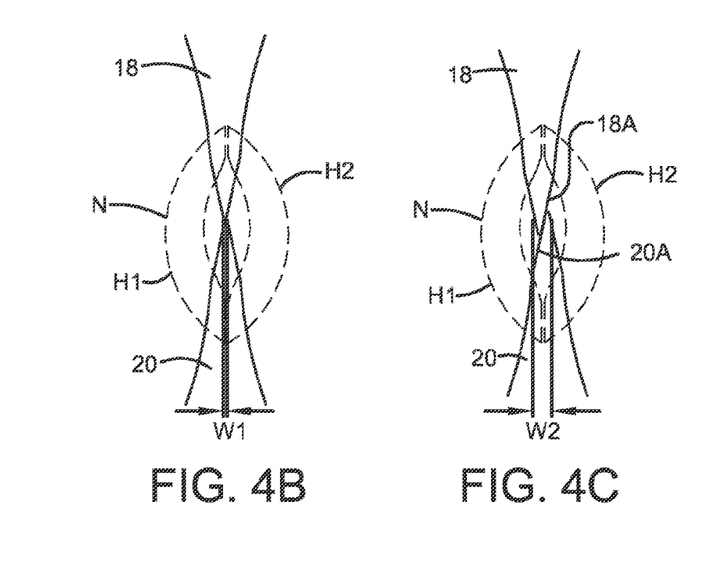
Figure 4D:
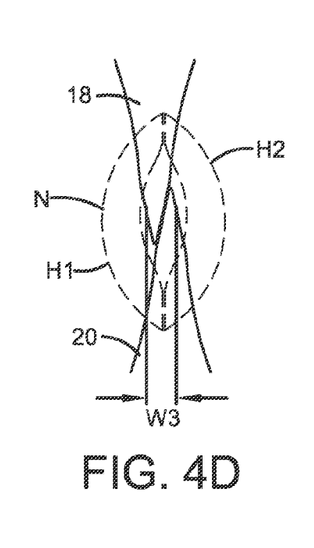
Figure 4E:
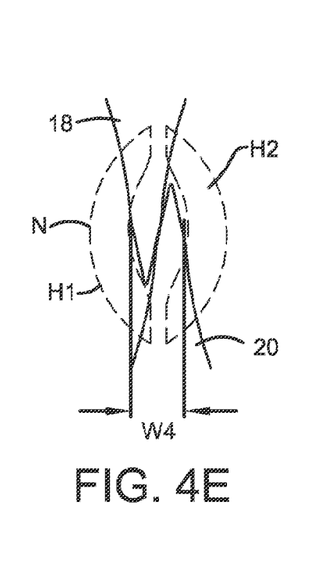

FIGS. 4B-4E are end views of nut opening apparatus 10 showing progressive illustrations of first tip 18 and second tip 20 engaging opposing shells H1 and H2 of nut N (shown in dashed lines). First tip 18 and second tip 20 slideably engage each other and gradually separate shells H1 and H2 from an initial open width W1 progressively to an open width W4 where shells H1 and H2 are spaced far enough to retrieve the edible portion of nut N. As illustrated in FIG. 4B, first tip 18 and second tip 20 are laterally aligned and vertically separated, i.e., vertically stacked, when no force is applied to first elongated arm member 14 and second elongated arm member 16. As a radially inward force is applied to first elongated arm member (not shown) and second elongated arm member (not shown), upward extending tapered edge 18a of first tip 18 slideably engages downward extending tapered edge 20a of second tip 20 to pry and/or wedge open opposing shells H1 and H2 to an open width W2 as illustrated in FIG. 4C. As further illustrated in FIGS. 4D-4E, further radially inward force applied to nut opening apparatus further outwardly pries and/or wedges open edges of opposing shells H1 and H2 to open widths W3 and W4 as illustrated in FIGS. 4D and 4E, respectively, until the seat between the shells breaks or until enough clearance between the shells exists to remove the edible kernel or meat portion of nut N. In the illustrated embodiments, tips 18 and 20 and tapered edges 18a and 20a, respectively, provide a wedging force perpendicular to partial opening P1 direction to break the seal between shells H1 and H2. Further, tips and edges provide a prying open force parallel to the partial opening P1 direction.

Figure 4F:
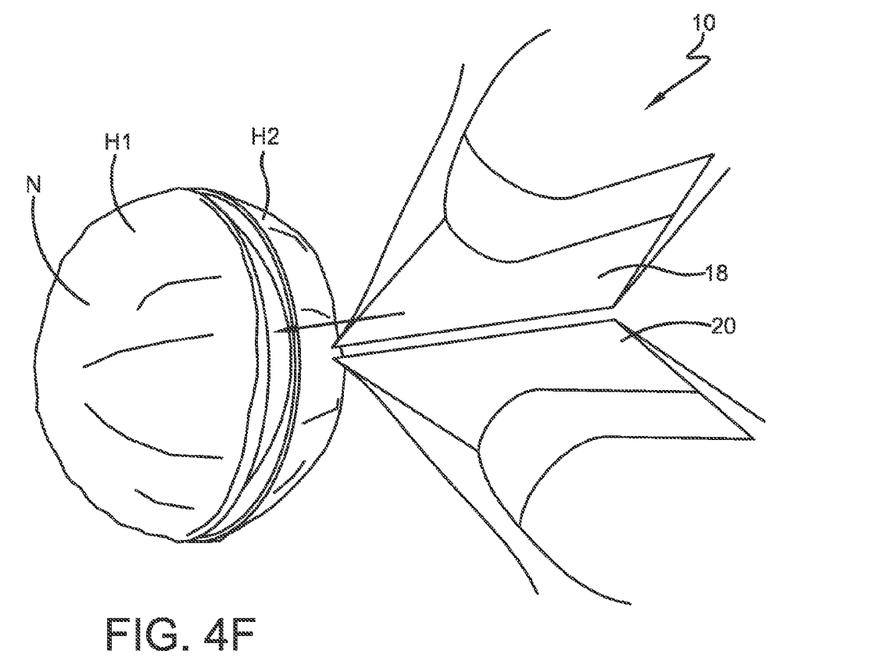
FIGS. 4F-4G are partial side views of nut opening apparatus approaching and engaging, respectively, opposing shell portions of a nut.
Figure 4G:
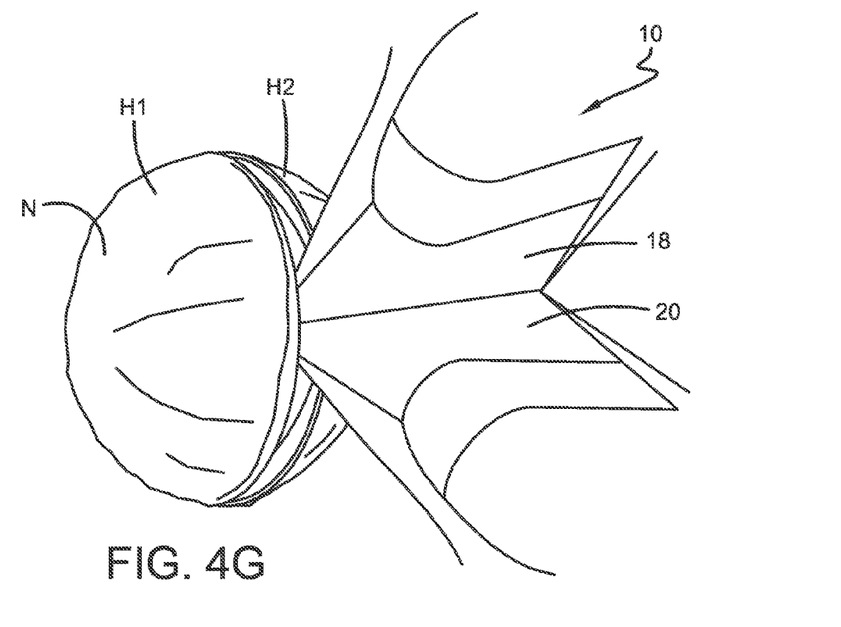

FIGS. 4F-4G are partial side views of nut opening apparatus 10 showing progressive illustrations of first tip 18 and second tip 20 engaging opposing shells H1 and H2 of nut N (shown in dashed lines). FIG. 4F illustrates an approach of the nut opening apparatus into a narrow opening between opposing shells H1 and H2 and FIG. 4G illustrates the tips 18 and 20 inserted between shells H1 and H2 just before tips 18 and 20 slideably engage each other and gradually separate shells H1 and H2. At least one of the tips 18 or 20 may be initially be inserted between shells H1 and H2 to partially open a nut N having a very narrow opening that cannot receive both tips.

Figure 5:
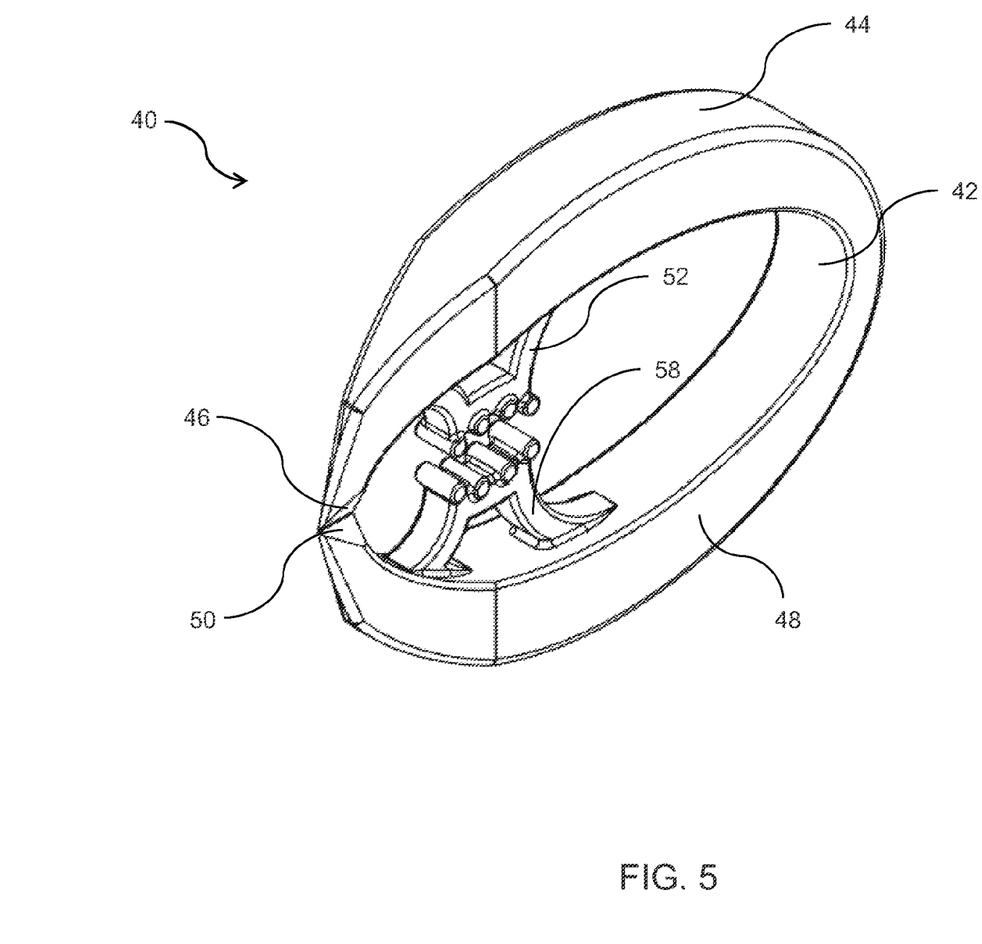
FIG. 5 is a top perspective view of another alternative nut opening apparatus.
Figure 6:
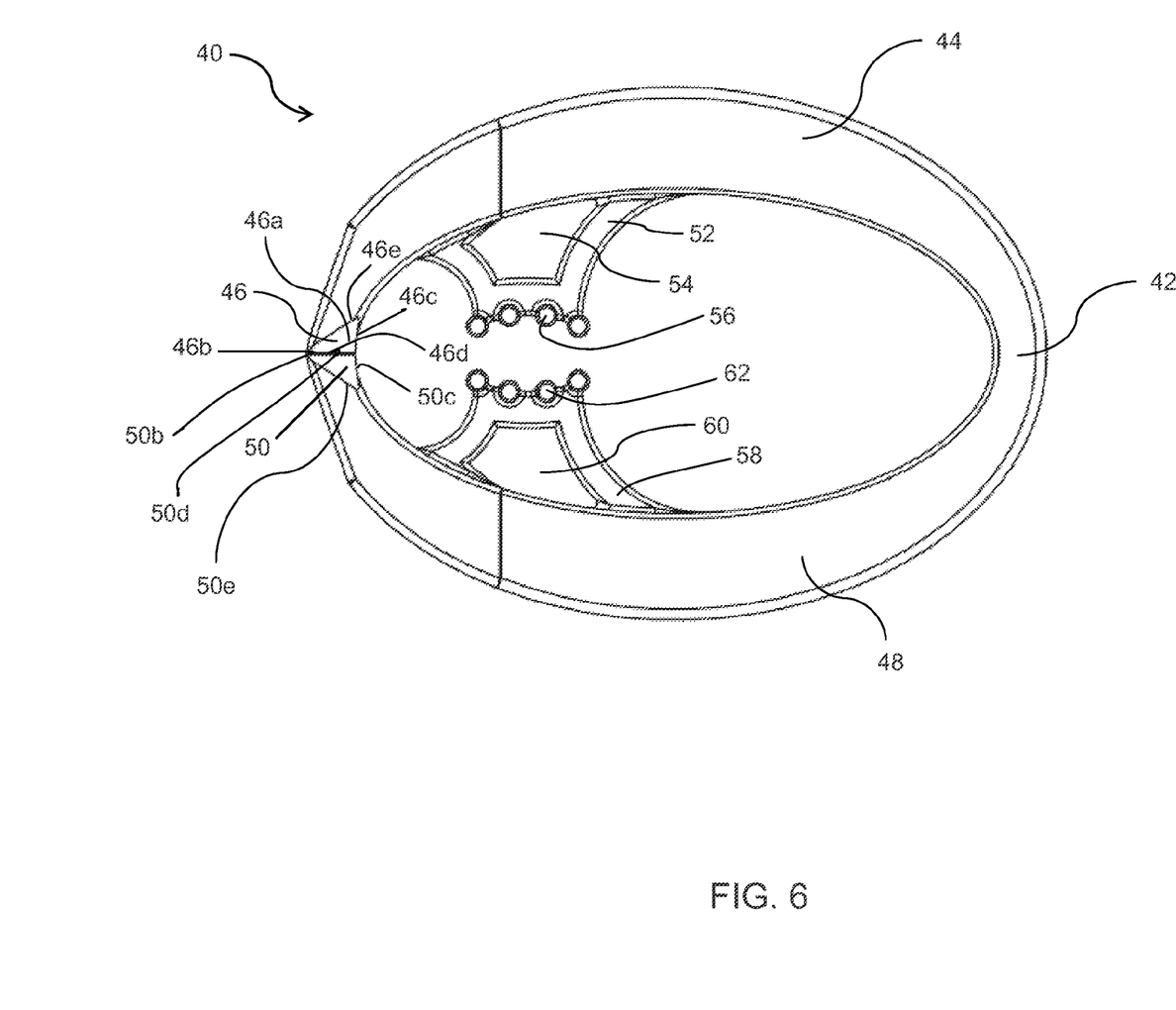
FIG. 6 is a side view of the alternative nut opening apparatus.

FIG. 5 is a top perspective view of another alternative nut opening apparatus 40 and FIG. 6 is a side view of the alternative nut opening apparatus 40. Nut opening apparatus 40 has a monolithic c-shape, including hinge portion 42, first longitudinally extending arm 44 having first tip 46, and second longitudinally extending arm 48 having second tip 50 that is longitudinally adjacent to first tip 46. First longitudinally extending arm 44 and second longitudinally extending arm 48 are minor images of each other, each having an arcuate shape that longitudinally extends from hinge portion 42. In the illustrated embodiments, nut opening apparatus 40 may be made from at least one plastic or metal material discussed above. In addition, the apparatus may be made by injection molding, machining, casting, and other manufacturing processes.

In the illustrated embodiments, hinge portion 42 is a resiliently flexible portion that has an arcuate shape. As discussed above, the resiliently flexible hinge portion allows a radially inward force applied to the longitudinally extending arms, e.g., a hand squeezing the apparatus, to move first tip 46 and second tip 50 past each other in a slideably engaged fashion. Hinge portion 42 substantially returns to its original shape and first tip 46 and second tip 50 return to longitudinally adjacent positions when the radially inward force is removed. In another embodiment, the hinge portion has at least one reinforcing rib to add strength and durability to the hinge. In another embodiment, the hinge portion may have a spiral shape, a helical shape, a partial square shape, or another flexible and resilient shape.

In the illustrated embodiments, upper crusher structure 52 extends downward from two radially inner locations of first longitudinally extending arm 44 to form upper aperture 54. Forming a lower portion of upper crusher structure 52 are a plurality of crushers 56 in the form of laterally extending tubular members in a downward arcuate shape. Similarly, lower crusher structure 58 extends upward from two radially inner locations of second longitudinally extending arm 48 to form lower aperture 60. Forming an upper portion of lower crusher structure 58 are a plurality of crushers 62 in the form of laterally extending tubular members in an upward arcuate shape. Unlike the nut opening apparatus discussed above, the upper and lower crusher structures 52 and 58 do not longitudinally extend to first tip 46 and second tip 50. The arcuate shapes of crushers 56 and crushers 62 complement each other to hold at least a portion of a nut shell (not shown) and may be fashioned to crush the nut shell when radially inward forces are applied to at least one of the longitudinally extending arms. As discussed above, crushers 56 and 62 may be referred to as grippers and also function as a stop to limit over flexing of hinge portion 42.

Figure 7:
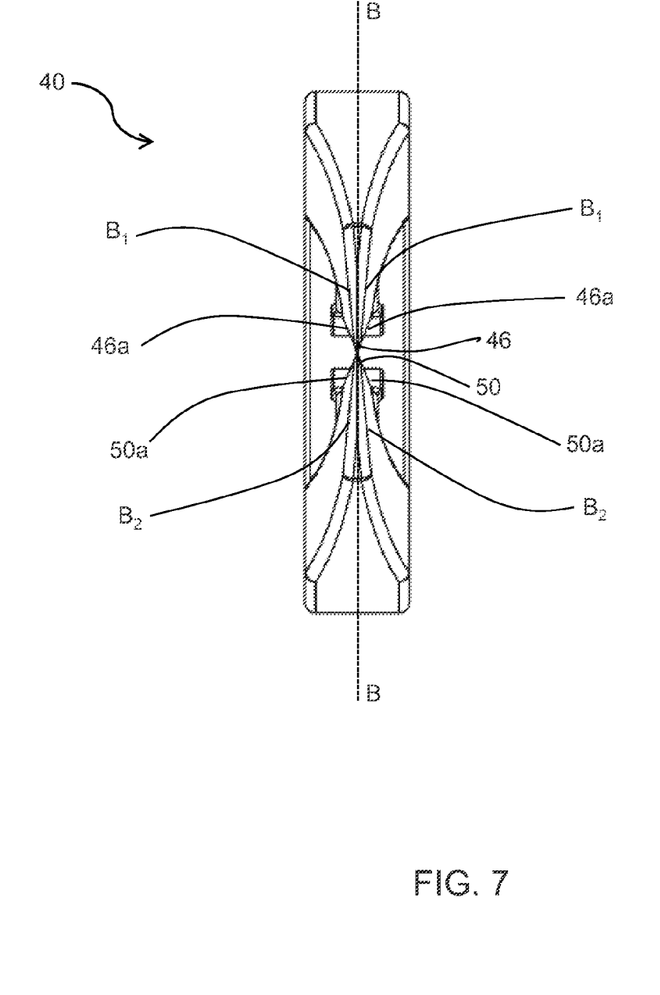
FIG. 7 is a forward end view of the alternative nut opening apparatus.

FIG. 7 is a forward end view of the alternative nut opening apparatus. In the illustrated embodiments of FIGS. 6-7, nut opening apparatus 40 includes first tip 46 having two upward extending tapered edges 46a forming an upper pointed tip or pincer. Each upward extending tapered edge 46a has a triangular surface that extends longitudinally from forward tip 46b to rearward edge 46c and extends vertically from bottom edge 46d upward to upper edge 46e. Similarly, second tip 50 includes two downward extending tapered edges 50a forming a lower pointed tip or pincer. Each downward extending tapered edge 50a also has a triangular surface that extends longitudinally from forward tip 50b to rearward edge 50c and extends vertically from upper edge 50d downward to lower edge 50e. In another embodiment, the tips may include greater or less than the number of edges illustrated in FIGS. 6-7. In yet another embodiment, each tip may include two or more forward tips to facilitate initial insertion of the apparatus in the partial opening of the nut shell.

In the illustrated embodiment shown in FIG. 7, upward extending tapered edges 46a are at an angle $\beta 1$ relative to a vertical plane B-B and downward extending tapered edges 50a are at an angle $\beta 2$ relative to the vertical plane B-B. In the illustrated embodiment, angle $\beta 1$ and angle $\beta 2$ are substantially equal, e.g., about thirty degrees. In another embodiment, at least one of the angles of the tapered edges is not substantially equal to the angles of the other tapered edges.

In the illustrated embodiment, tapered edges on both lateral sides of first tip 46 and second tip 50 allow first tip 46 to slide downward on either downward extending tapered edge 50a of second tip 50, e.g., along the left side or the right side as viewed in FIG. 7. Similarly, second tip 50 can slide upward on either upward extending tapered edge 46a of first tip 46, e.g., along the left side or the right side as viewed in FIG. 7. The tips are pointed to fit in a partial opening between shell portions. Further, the tapered edges slideably engage each other to wedge open the shell portions, substantially similar to the tips and the tapered edges, discussed above in reference to FIGS. 4A-4E. In another embodiment, the first tip and/or the second tip only has one tapered lateral edge.

Figure 8:
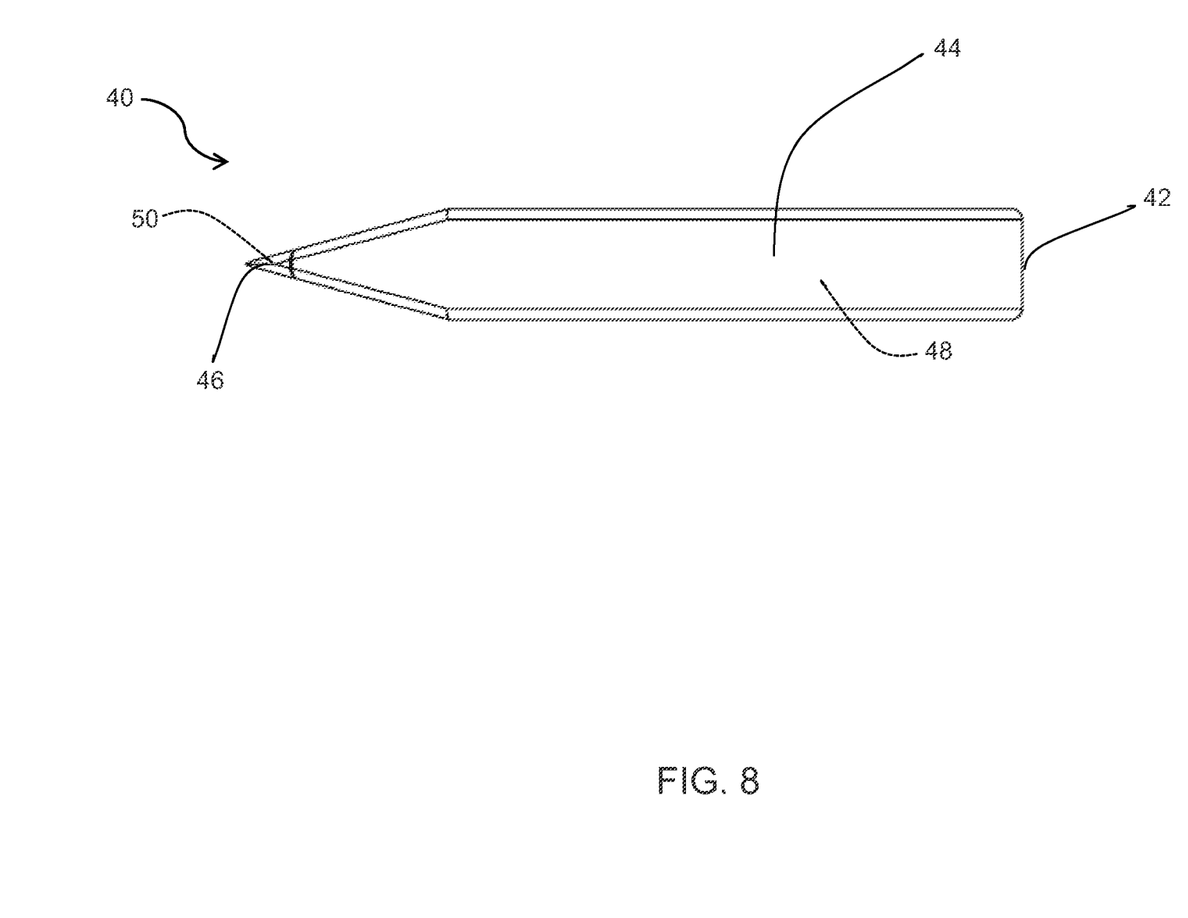
FIG. 8 is a top view of the alternative nut opening apparatus.

FIG. 8 illustrates a top view of the alternative nut opening apparatus 40. In the illustrated embodiment, first longitudinally extending arm 44 and second longitudinally extending arm 48 have a substantially constant lateral width from hinge portion 42 to about three fourths of the longitudinal length where first longitudinally extending arm 44 and second longitudinally extending arm 48 inwardly taper to first tip 46 and second tip 50, respectively. In another embodiment, the nut opening apparatus has a lateral width that is not substantially constant between the hinge portion and about three-fourths of its length.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

What is claimed is:

1. A nut opening apparatus comprising:

a first arm and a second arm, the first arm having a first tip that extends downward and outward from the first arm and terminating in a first tapered edge;

the second arm having a second tip that extends upward and outward from the second arm and terminating in a second tapered edge;

wherein the first tip and the second tip are aligned with each other in a first plane when no force is applied to the first arm and the second arm, wherein the first tapered edge extends downward and laterally outward from one side of the first plane and the second tapered edge extends upward and laterally outward from an opposite side of the first plane;

wherein the first arm and the second arm are joined by a hinge, wherein at least the first arm, the second arm and the hinge are formed as a monolithic member, the first arm and the second arm being compressible about the hinge to move the tips inward along the plane to cause the first tapered edge to engage the second tapered edge and wherein further compression causes the first tapered edge to slide along the second tapered edge to progressively increase a width defined by the overlapping portions of the first tip and the second tip in a direction perpendicular to the first plane;

wherein the first arm and the second arm are joined by a hinge, wherein at least the first arm, the second arm and the hinge are formed as a monolithic member, the first arm and the second arm being compressible about the hinge to move the tips inward along the plane to cause the first tapered edge to engage the second tapered edge and wherein further compression causes the first tapered edge to slide along the second tapered edge to progressively increase, in a direction perpendicular to the first plane, a width defined by overlapping portions of the first tip and the second tip.

2. The nut opening apparatus of claim 1, wherein the hinge includes a reinforcing rib having an arcuate shape.

3. The nut opening apparatus of claim 1, wherein the first tip and the second tip are substantially adjacent to each other when no force is applied to the first arm and the second arm.

4. The nut opening apparatus of claim 1, wherein the first tip and the second tip have at least one of the following: a pointed tip, a rounded tip, a flat tip, a concave contour, and an offset angled edge.

5. The nut opening apparatus of claim 1 further comprising an upper crusher portion extending between the first arm and the first tip and a lower crusher portion extending between the second arm and the second tip.

6. The nut opening apparatus of claim 5, wherein the upper crusher portion and the first arm are at least partially separated by at least one of the following: an aperture, a web, and a reinforcing rib.

7. The nut opening apparatus of claim 5, wherein the lower crusher portion and the second arm are at least partially separated by at least one of the following: an aperture, a web, and a reinforcing rib.

8. The nut opening apparatus of claim 5 further comprising an upper crusher extending from the upper crusher portion and a lower crusher extending from the lower crusher portion, wherein the upper crusher or the lower crusher has an arcuate shape.

9. The nut opening apparatus of claim 8, wherein the upper crusher and the lower crusher form a stop that limits movement of the hinge.

10. The nut opening apparatus of claim 1, wherein the first arm and the second arm are symmetrical relative to each other, and wherein the first tip and the second tip are symmetrically formed relative to each other.

11. The nut opening apparatus of claim 1, wherein the hinge has an arcuate shape.

12. The nut opening apparatus of claim 1, wherein the first arm includes a first angled edge offset from the first tip and the second arm includes a second angled edge offset from the second tip.

13. The nut opening apparatus of claim 1, wherein the first arm, the first tip, the second arm, the second tip, and hinge form a c-shape.

* * * * *